S. SPITZ.
LICENSE PLATE HOLDER.
APPLICATION FILED MAR. 8, 1921.
1,407,896. Patented Feb. 28, 1922.
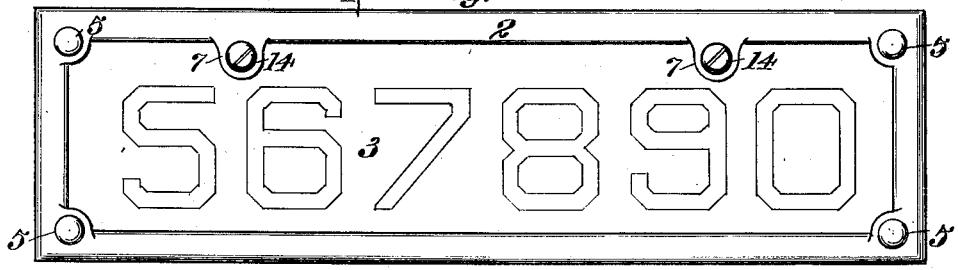
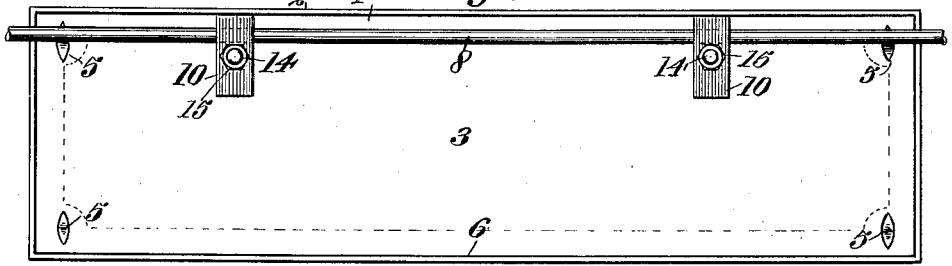
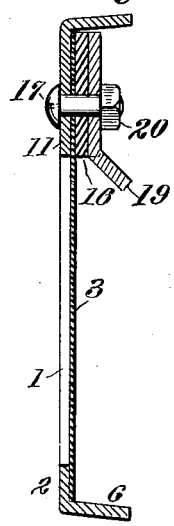
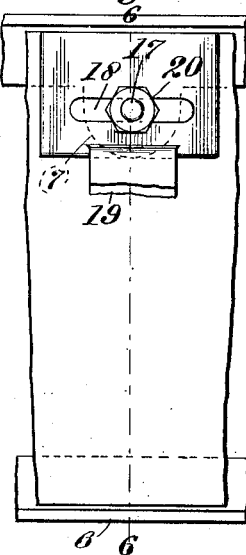
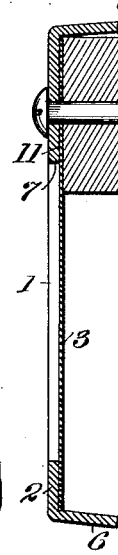
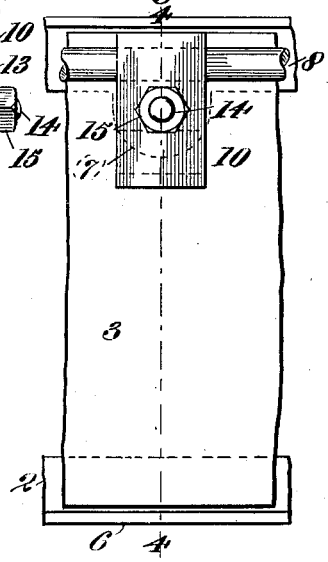
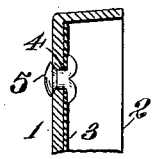

UNITED STATES PATENT OFFICE.

SAMUEL SPITZ, OF OAKLAND, CALIFORNIA, ASSIGNOR TO WILLIARD VERNON PUMPHREY AND HENRY W. SCHNEBLY, BOTH OF OAKLAND, CALIFORNIA.

LICENSE-PLATE HOLDER.

1,407,896.   Specification of Letters Patent.   Patented Feb. 28, 1922.

Application filed March 8, 1921. Serial No. 450,775.

*To all whom it may concern:*

Be it known that I, SAMUEL SPITZ, a citizen of the United States, residing at the city of Oakland, in the county of Alameda and State of California, have invented certain new and useful Improvement in License-Plate Holders, of which the following is a specification.

Automobile license plates as at present constructed are of very thin flexible material and lack rigidity which permits the same to be mounted in place on the vehicle, and when mounted to be free from rattle and vibration.

The recently issued license plates, due to the poor material and thin gauge of material used in their construction, when subject to the vibrations of the vehicle and the air currents generated during the movement of the vehicle, vibrate to such a degree as to create a disagreeable rattle and noise to the vehicle occupants, and the present invention relates to a means for providing a mounting for receiving the vehicle license plates of this thin inferior construction, whereby the same are ornamented in their appearance and are held to the vehicle rigidly and free from vibration.

License plates as universally used are provided at certain points in their surface with attaching apertures for enabling the securing of the plate to the majority of brackets provided on motor vehicles, and to adapt the frame for universal use, the same is provided with apertures registering in the majority of instances with the apertures in the plate, enabling the plate to be retained in the frame, and the frame and plate to be mounted on a vehicle.

A further object of this invention is to provide a construction, whereby the plate may be readily removed from the frame at the expiration of the year and a new plate substituted within the same frame.

With the above mentioned and other objects in view, the invention consists in the novel construction and combination of parts hereinafter described, illustrated in the accompanying drawings and pointed out in the claims hereto appended; it being understood that various changes in the form, proportion, size, and minor details of construction within the scope of the claims may be resorted to without departing from the spirit or sacrificing any of the advantages of the invention.

To more fully comprehend the invention, reference is directed to the accompanying drawings, wherein—

Fig. 1 is a view in elevation of the preferred embodiment of my invention, illustrating a license plate held within the frame and disclosing the means for securing the plate within the frame, and the means for securing the frame and plate to the vehicle.

Fig. 2 is a view in rear elevation of the preferred embodiment of plate and frame mounted at the forward end of a vehicle.

Fig. 3 is an enlarged detailed rear view of the frame and mounting clamp employed at the forward end of the vehicle.

Fig. 4 is a sectional view taken on line 4—4—Fig. 3.

Fig. 5 is a view similar to Fig. 3, disclosing the form of clamp and mounting for the frame at the rear of the vehicle.

Fig. 6 is a vertical sectional view taken on line 6—6—Fig. 5.

Fig. 7 is a fragmentary sectional view of one of the split rivets for securing the corner of the plate to the frame.

Referring more particularly to the drawings, wherein like characters of reference designate corresponding parts,—1 indicates a suitable elongated open frame, preferably of cast or stamped construction, and provided with the annular inwardly projecting front or face wall 2 against the rear surface of which is adapted to contact the peripheral edge of a vehicle license plate 3. The front wall or face 2 at its inner corners is formed with the rivet receiving apertures 4 adapted to register with corresponding apertures in the corners of the plate 3 and which latter apertures are formed therein by the plate manufacturer. The license plate is held within the frame at its corner by suitable split rivets 5 or other securing means extending through the opening 4 and the aligned openings in the plate 3. The spreading of the rivets 5 tightly clamps and retains the license plate 3 against the inner face of the wall or surface 2.

Formed integral with the peripheral edge of the front wall 2 of the frame 1 is a rearwardly disposed peripheral wall 6 providing a pocket in the rear of the frame 1 for the reception of the license plate, and said wall affords a finish for the frame 1 and prevents the warping of the frame, and at the same time adds rigidity thereto.

As in Fig. 1, the inner edge of the front wall 2 at spaced points from each other and from the inner corners is provided with the apertured mounting ears 7 adapted to register with suitable apertures formed in the plate by the manufacturer, and when the plate on mounting the frame is attached to the transverse lamp bracing rod 8, utilized as a license plate mounting on the majority of vehicles, the frame is detachably clamped thereto by the following mechanism.

A clamp base and movable clamp member 9 and 10 are positioned in rear of each ear 7 of the front flat face 11 of the base in contact with the inner surface of the license plate 3, Fig. 4. Adjacent cooperating surfaces of the members 9 and 10, are formed with registering cooperating depressions 12 and 13 extending transversely of the members 9 and 10 and longitudinally of the frame 1 affording receiving depressions of different diameters for receiving the rods 8, which on certain machines differ in circumference. The members 9 and 10 are provided with aligned bolt receiving openings through which is adapted to extend a clamp bolt 14, mounting on its end a clamp nut 15, and the tightening of the nut on the bolt on the reception of a rod within one of the seats 12 or 13 causes a tight pressure to be exerted by the front face 11 of the member 10 on the rear surface of the plate 3, further clamping and retaining the plate 3 in contact with the inner face of the front wall 2 of the frame 1 between its inner corners, and immediately in rear of the respective ears 7.

The particular clamp illustrated in Figs. 2, 3 and 4 is eliminated in attaching the frame with its mounted license plate to the rear of the vehicle. However, a member or base 16 corresponding to the member 9 is employed, and as in the other clamp, the member 16 is provided with an aperture through which a short clamping bolt 17 extends, said bolt extending also through the slotted opening 18 in the supporting bracket 19 and the attachment of the securing nut 20 forces the member 16 tightly against the rear face of the plate 3 maintaining the front face of the same in contact with the rear face of the ears 7 and the inner surface of the upper wall 2. In both instances the members 9 and 16 facilitate in retaining the plate 3 within the frame at points intermediate of the point of attachment of the plate within the frame, that is when the frame is mounted in position on the vehicle, and the rivets serve to prevent the removal of the plate from the frame until it is desired to renew the plate, and also afford a means for tightly retaining the front peripheral surface of the plate 3 in contact with the rear surface of the annular inwardly projecting frame front wall 2.

I claim:—

1. A vehicle license plate holder comprising an oblong rectangular open frame adapted to receive a vehicle license plate, said frame formed with an annular inwardly projecting front wall adapted to overlie the front face of the periphery of said plate, said wall provided at its inner corners with apertures for registering with apertures in the plate, a securing means passing through said apertures for retaining the plate in position within the frame, a peripheral wall extending rearwardly from and integral with the outer edge of said front wall, said peripheral and front walls forming a plate receiving pocket, and means for securing the frame to a support.

2. A vehicle license plate holder comprising an oblong rectangular open frame formed in a single piece and the wall thereof being substantially L-shaped in cross section providing a pocket for the reception of a license plate, the face portion at its inner corners being provided with apertures adapted for receiving plate securing means, and means passing through the face portion between the corners for securing the frame to a support and for clamping the plate therein.

3. A vehicle license plate holder comprising an oblong rectangular open frame formed in a single piece, said frame provided with a rearwardly disposed peripheral wall forming a pocket within which the vehicle license plate is inserted from the rear of the frame, means extending through the frame and license plate for detachably securing the license plate within the frame, a pair of securing members extending through the frame wall for detachably securing the frame to a support, and a spacer member carried on each of said securing members in contact with the rear of the plate and for engaging with a support, said spacers forcing the license plate within the frame and affording a rigid connection between the frame and support.

In testimony whereof I have signed my name to this specification.

SAMUEL SPITZ.